United States Patent
Hodge (10) Patent No.: US 9,794,399 B1
(45) Date of Patent: Oct. 17, 2017

(54) SYSTEM AND METHOD FOR MULTILINGUAL AUTHENTICATION ACCESS TO COMMUNICATION SYSTEM IN CONTROLLED ENVIRONMENT

(71) Applicant: **GLOBAL TEL*LINK CORP.**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/390,296

(22) Filed: Dec. 23, 2016

(51) Int. Cl.
*H04M 11/00* (2006.01)
*H04M 3/38* (2006.01)
*H04M 3/42* (2006.01)

(52) U.S. Cl.
CPC ............ *H04M 3/38* (2013.01); *H04M 3/385* (2013.01); *H04M 3/42068* (2013.01); *H04M 2201/41* (2013.01); *H04M 2203/6054* (2013.01); *H04M 2203/6072* (2013.01); *H04M 2242/12* (2013.01)

(58) Field of Classification Search
CPC ............ G06F 21/31; G06F 2221/2111; G06F 2221/2103; H04M 3/2281; H04M 2221/2111
USPC ...... 379/93, 3, 202.01, 142.05, 88.02; 726/6, 726/28; 455/411; 713/186
See application file for complete search history.

(56) References Cited

U.S. PATENT DOCUMENTS

| | | | | |
|---|---|---|---|---|
| 2007/0071206 A1* | 3/2007 | Gainsboro | .......... | H04M 3/2281 379/168 |
| 2009/0241201 A1* | 9/2009 | Wootton | .................. | G06F 21/31 726/28 |
| 2012/0072975 A1* | 3/2012 | Labrador | ................ | G06F 21/31 726/6 |
| 2016/0300576 A1* | 10/2016 | Karpey | ................... | G10L 17/26 |

\* cited by examiner

*Primary Examiner* — Melur Ramakrishnaiah
(74) *Attorney, Agent, or Firm* — Sterne, Kessler, Goldstein & Fox P.L.L.C.

(57) ABSTRACT

A system and method for multilingual authentication access to a communication system in a controlled environment is disclosed. The system includes a communication subsystem that connects a communication between a first communication device and a second communication device, wherein one of the first communication device or the second communication device is used by the inmate of the correctional system. The system also includes a profile subsystem configured to determine profile information of a party associated with the first communication device. The system further includes an authentication subsystem that provides one or more challenge questions to the first communication device based on the profile information, receives at least one response to the one or more challenge questions from the first communication device, and authorizes connection of the communication between the first communication device and the second communication device based on the at least one response.

20 Claims, 6 Drawing Sheets

FIG. 6

SYSTEM AND METHOD FOR MULTILINGUAL AUTHENTICATION ACCESS TO COMMUNICATION SYSTEM IN CONTROLLED ENVIRONMENT

BACKGROUND

Field

This disclosure relates to a system and method for multilingual authentication access to a communication system in a controlled environment.

Background

In a controlled environment such as a correctional facility, before a user, such as an inmate or an outsider contacting the inmate, is able to initiate a communication or send the communication, a communication system for the controlled environment authenticates an identity of the user via an authentication system. Examples of communications via a typical communication system include audio calls, video calls, text, or emails Traditionally, authentication systems require a user perform an authentication process by entering, via a keypad, a personal identification number (PIN) or, at a separate point in time, providing a voice sample, an image sample, or a video sample during the communication. However, stronger methods of authentication are needed.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communication System

Figure 1:
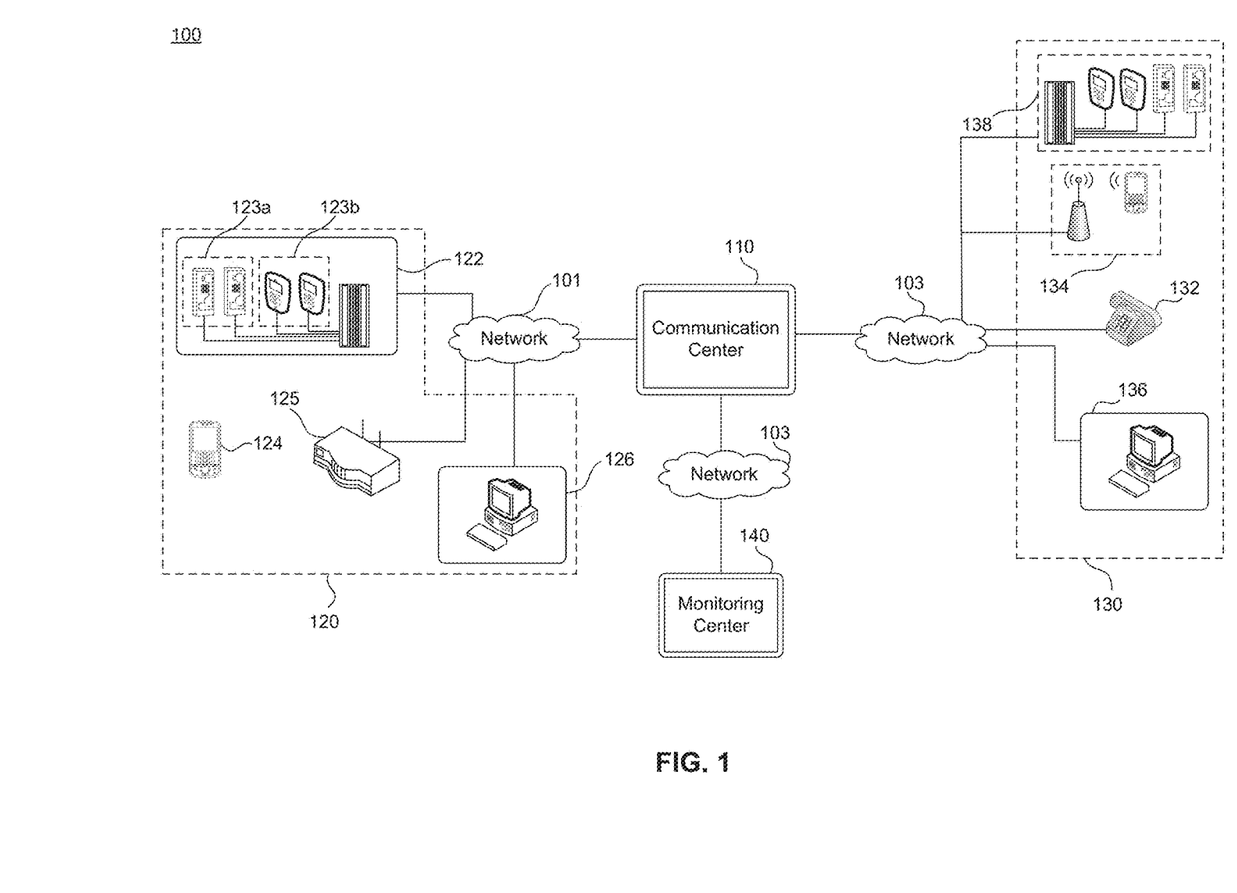
FIG. 1 illustrates a block diagram of a communication system, according to embodiments of the present disclosure.

FIG. 1 illustrates a block diagram of communication system 100, according to embodiments of the present disclosure. Communication system 100 includes communication center 110 configured to receive and transmit communications between inmate communication device 120 and outsider communication device 130. In this disclosure, a communication refers to real time communications, such as voice or video calls, and non-real time communications, such as a text or email, between an inmate using inmate communication device 120 and an outsider using outsider communication device 130.

Inmate communication device 120 includes any or all devices such as wired communication devices 122, which include audio communication devices 123a and video communications devices 123b, wireless communication device 124, and/or control station 126. In an embodiment, communication center 110 connects to wireless access point 125 (e.g., a router), which may provide connectivity to wireless communication device 124. Inmate communication device 120, such as video communications devices 123b, wireless communication device 125, and/or control station 126, are configured to include a camera and a screen for generating and viewing videos or images. Inmate communication device 120 connects to communication center 110 via network 101, which may include any or all of a Local-Area Network (LAN), a Wide-Area Network (WAN), or the Internet.

Outsider communication device 130 includes any and all devices such as basic telephone 132, wireless communication device 134, work station 136, and/or audio or video communication device 138. Outsider communication device 130, such as wireless communication device 134, work station 136, and/or audio/video communication device 138 may be configured to include a camera and a video screen for generating and viewing a video. Outsider communication device 130 connects to communication center 110 via network 103, which may include any or all of a WAN, the Internet, and/or a Public Switched Telephone Network (PSTN). The WAN may facilitate communications with other nearby prisons, such as those within the same county, state, etc. Wired audio and/or video communication device 138 located at those other facilities may provide cross-facility visitations between inmates.

In an embodiment, WebRTC may be utilized in place of a session initiation protocol (SIP) over a WAN or the Internet, each of which provides a dedicated, private link between inmate communication device 120 and outsider communication device 130. The Internet is utilized to provide access to work station 136 such as remotely distributed control stations, scheduling clients, and home visitation devices. The PSTN can be used to provide connectivity to basic telephone 132 and/or the wireless communication device 134 and other communication devices (not shown) over traditional data networks.

In an embodiment, communication system 100 also includes monitoring center 140 facilitate the monitoring of communications both automatically and manually by a reviewer. Monitoring center 140 is configured to receive communications from communication center 110 via network 105, which may include any or all of a LAN, a WAN, or the Internet. In an embodiment, monitoring center 140 is further be configured to communicate with communication center 110 to indicate approval of starting, sending, or receiving a communication after an initial monitoring verification has been performed.

Communication System

Figure 2:
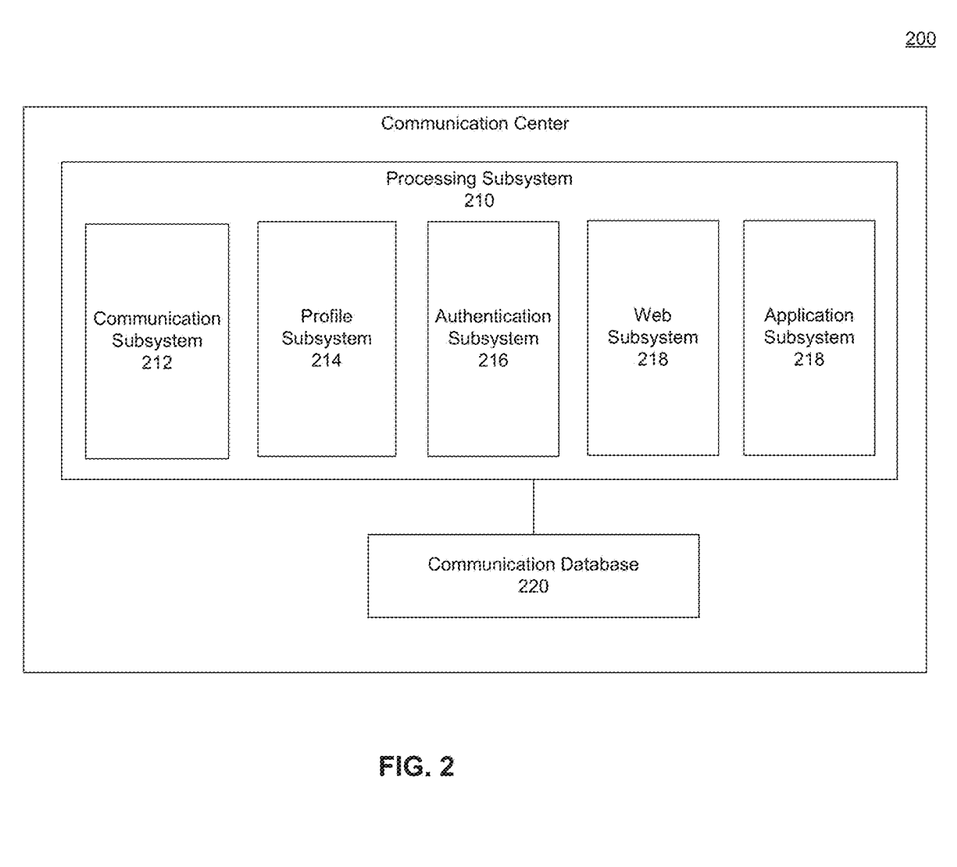
FIG. 2 illustrates a block diagram of a communication center of the communication system of FIG. 1, according to embodiments of the present disclosure.

FIG. 2 illustrates a block diagram of communication center 200, according to embodiments of the present disclosure. Communication center 200 may represent an exemplary embodiment of communication center 110 of FIG. 1. Communication center 200 includes at least processing subsystem 210 and communication database 220, as shown by FIG. 2. Processing subsystem 210 includes one or more processors, computers, or servers identified as subsystems and can be constructed as individual physical hardware devices, or as virtual devices, such as a virtual server. The number of processing subsystems can be scaled to match the number of simultaneous user connections desired to be supported by communication system 100. Processing subsystem 210 includes communication subsystem 212, profile subsystem, 214, and authentication subsystem 216.

Communication subsystem 212 controls the routing of communications to an end destination such as one of inmate communication device 120, outsider communication device 130, or monitoring center 140. In doing so, communication subsystem 212 performs switching required to electrically connect to parties. Further, communication subsystem 212 logs communication information, including time of communications and parties involved in the communications, and store the logs and communications as files. The files stored by communication subsystem 212 can be stored indefinitely for use by monitoring center 140 in monitoring and investigation of an inmate and/or communication. In an embodiment, communication subsystem 212 also determines whether a communication should be monitored such that privileged communications such as attorney/client, doctor/client, or investigative communications are not monitored. Criteria for monitoring a communication may be based on jurisdictional requirements and/or identities of the parties.

In an embodiment, communication subsystem 212 is configured to receive contact information such as a phone number, email address, internet protocol address or other identifying data of the parties involved in the communication. The received contact information may be used by each of the subsystems of the communication center 200 for identifying respective data and processes related to the contact information, such as purported identities of parties involved in the communication.

Because there may be a variety of different communication standards employed by different audio, video, image, and text devices that wish to participate in communications, in an embodiment, communication subsystem 212 is also configured to perform format conversion of non-real time communications. Conversion of incoming and outgoing communications are performed, as needed, to be compatible with inmate communication device 120, outsider communication device 130, or monitoring center 140.

Further, because communication subsystem 212 receives and transmits communications by way of a network, in an exemplary embodiment, communication subsystem 212 is configured to decrypt received communications and encrypt transmitting communications, for security purposes.

Profile subsystem 214 obtains and stores profile information on parties registered to communicate via communication system 100. Profile subsystem 214 obtains information related to the parties from one or more of (a) a jail management system (JMS) or an offender management system (OMS) operated by the jurisdiction of the correctional facility, (b) public database containing information on the parties, or (c) a questionnaire provided by a web page, a personal approved number (PAN) list, or booking information. Information obtained by profile subsystem 214 may include personal information such as previous residences or correctional facilities, authorized contacts, family members, languages, special needs, medication requirements, etc.

Profile subsystem 214 also performs a registration process for those parties not enrolled or registered to use communication system 100. During the registration process, or at a later time, profile subsystem 214 determines accommodations and settings associated with a party and/or a party is able to select preferred settings for a communication. These accommodations and settings include, but are not limited to, preferred language, preferred contact method, or any special needs or accommodations such as a handicap that may affect authentication requirements.

Authentication subsystem 216 collects and stores identity data of inmates and outsiders authorized to access the communication system 100. Identity data includes at least one of a username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data may be a series of challenge questions, or a single challenge question such as the last four digits of an inmate's social security number, mother's maiden name, and the like. Authentication subsystem 216 is further configured to facilitate a secure communication between parties receiving/transmitting a communication by performing identity verifications to authenticate identities of purported parties. The identity verification includes logon verifications, such as username and password verifications, biometric verification, response to challenge questions, device verification, and/or location verification.

Authentication subsystem 216 performs an identity verification by receiving identity information such as one or more of a username and password, a response to a challenge question(s), a keypad or touch pad entry, dual tone multi frequency (DTMF) response, a voice sample, a fingerprint sample, a retinal sample, a facial image (2D or 3D), device information such as a make and model of the communication device, and/or a location of the communication device, from a communication device (either 120 or 130) used by a purported party and comparing the identity information of the purported party with stored identity data.

Web subsystem 218 runs web server software such as Apache and/or Microsoft Internet Information Server and/or an interactive voice response (IVR) server software. The primary function of web subsystem 218 is to operate as a frontend and/or backend server in receiving and transmitting information to a party communication center 200. In an embodiment, web subsystem 218 can also serve as a maintenance point into communication center 200, by which servicing, configuring, and updating can be performed. In an embodiment, the web subsystem 218 provides managing services for generating communications, receiving instructions from a party to send or receive communications, and coordinating and scheduling the transmission of communications. For example, web subsystem 218 can facilitate a party in generating a non-real time communication when the party uses a front-end application having a user interface.

Application subsystem 220 consists of any number of servers, and functions as the primary logic processing center in communication center 200. Application subsystem 220 manages and facilitates overall communication between subsystems off the communication center 200 and devices external to the communication center, such as inmate communication device 120 and outsider communication device 130.

Communication database 220 consists of any number of databases and/or servers, and stores and organizes data in a relational database. Communication database 220 runs a database management system, such as MYSQL™, to provide an example. Communication database 220 includes organized data such that respective identity data, authentication data, jurisdictional requirements and rules, and settings that are indexed and linked to allow access to data for each of the parties involved in a communication and data associated with each of the parties.

Communication Device

Figure 3:
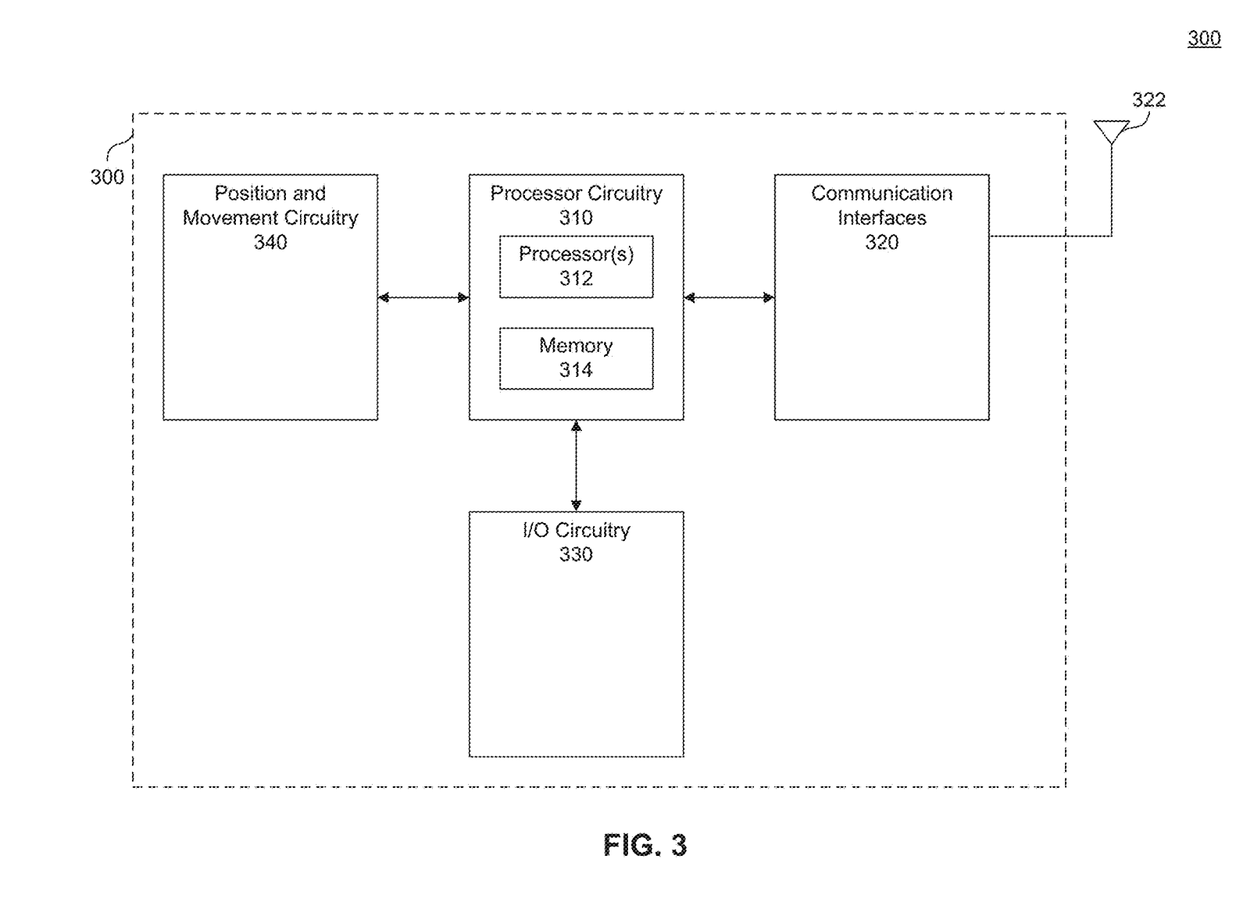
FIG. 3 illustrates a block diagram of a communication device of the communication system of FIG. 1, according to embodiments of the present disclosure.

FIG. 3 illustrates a block diagram of communication device 300, according to embodiments of the present disclosure. Communication device 300 may be an exemplary embodiment of inmate communication device 120 or outsider communication device 130. Communication device 300 includes processor circuitry 310 that is communicatively coupled to plurality of communication interfaces 320, input/output circuitry 330, and positional and motion circuitry 340. Processor circuitry 310 includes one or more processors 312, circuitry, and/or logic configured to control the overall operation of communication device 300, including the operation of communication interfaces 320, input/output circuitry 330, and positional and motion circuitry 340. Processor circuitry 310 further includes memory 314 to store data and instructions. Memory 314 may be any well-known volatile and/or non-volatile memory that is removable and/or non-removable.

Communication interfaces 320 include one or more transceivers, transmitters, and/or receivers that communicate via one or more antennas 322. Communication interfaces 320 are configured to transmit and receive communications between an inmate and an outsider via network 101 and network 103. In an embodiment, communication interfaces 320 may include one or more network cards configured to connect to a wired network.

Input/output circuitry 330 includes circuitry such as a keypad, a touch interface, a microphone, a camera, and a display. Input/output circuitry 330 may be used by a party for traditional mobile device communications such as audio, video, or text communications. Input/output circuitry 330 such as the microphone and camera are used during monitoring operations to capture audio and/or video of a party and surrounding areas.

In an embodiment, communication device 300 may include positional and motion sensors 340 include circuitry for determining a current location and a change in location of communication device 300. Positional and motion circuitry 340 may include such circuitry as Global Positioning System (GPS) technology, indoor positioning systems (IPS) technology, accelerometers, and/or gyroscopes to determine position and motion of communication device 300.

System Operation

Operations of authenticating a party for access to communication system 100 in a correctional system will be described with respect to FIGS. 4-5. Although the physical devices and components that form the system have largely already been described, additional details regarding their more nuanced operation will be described below with respect to FIGS. 1-3. While FIGS. 4-5 contain methods of operation of authentication for communication system 100, the operations are not limited to the order described below, and various operations can be performed in a different order. Further, two or more operations of each method can be performed simultaneously with each other.

Figure 4:
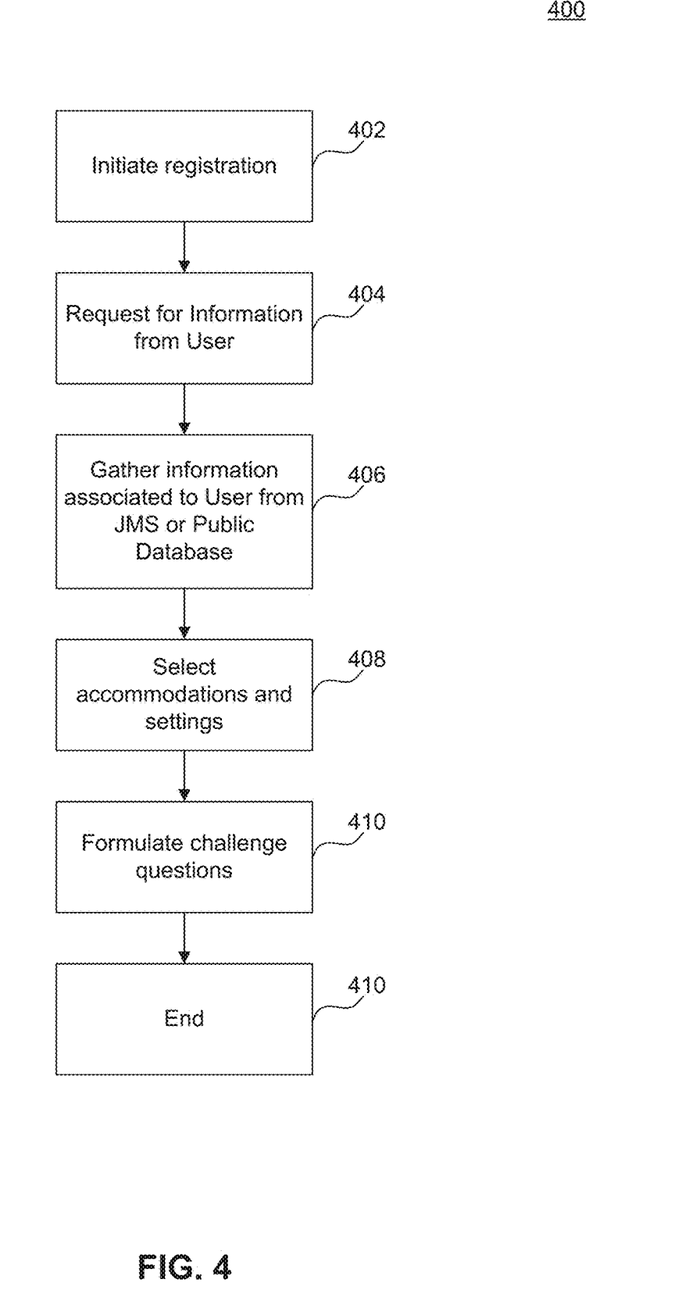
FIG. 4 illustrates a flowchart diagram of a method of registering a user via the communication system of FIG. 1, according to embodiments of the present disclosure.

FIG. 4 illustrates a flowchart diagram of a method of registering a user via the communication system of FIG. 1, according to embodiments of the present disclosure. In FIG. 4, a registration or enrollment process is facilitated for a party by inmate communication device 120 or outsider communication device 130 (402). A registration process initiates before or when an inmate or an outsider uses a communication system 100 for a first time. Registration may be performed via a website or IVR system, for example, when a party visits a designated website or calls a designated phone number facilitated by the correctional system. When an initial enrollment process initiates, profile subsystem 214 requests for initial information from the party via inmate communication device 120 or outsider communication device 130 (404). The initial information may include name, birthdate, social security number, contact information, a biometric sample, or other essential data needed to verify a party and obtain additional information associated with the party, as described below. Such information may be received by input/output circuitry 330 of communication device 300 and transmitted to communication center 110 via communication interface 320.

Once the initial information is received by communication center 110, profile subsystem 214 attempts to retrieve additional information (406). The additional information may be retrieved from third party sources such as a JMS database, an OMS database, or a public database. Next, profile subsystem 214 requests for preferred settings from the party via inmate communication device 120 or outsider communication device 130 (408). Preferred settings may include a preferred language, an accommodation due to a handicap that may affect authentication process, or preferred method of contact.

After, profile subsystem 214 formulates authentication processes including challenge questions that are available for the party based on the initial information, the gathered information from databases, and the preferred accommodations/settings (410). Formulation of the authentication processes includes determining accommodations or settings that prevent a party from performing a specific type of process. For example, the authentication process may exclude sending a text message to request information to a communication device if the party is blind. As another example, profile subsystem 214 may determine any biometric information that is unattainable due to accommodations or settings such as voice verification for a party that is hearing impaired or retinal scanning for a party that is blind. Formulation further includes determining challenge questions for a party to answer. For example, profile subsystem 214 determines one or more of a previous addresses of the party, the name of the party, a birthdate of the party, a PIN, a name of someone associated with the party, or an identification number of the party. Formulation further includes determining authentication process that is required per requirements of the correctional facility or jurisdiction. For example, profile subsystem 214 may determine that at least one biometric authentication and a challenge question are required for any communication and as such require a minimum of these authentication processes for any authentication process. Once the authentication processes pertaining to the party have been formulated, the registration process ends (412). During steps 402-412, all information obtain by communication center 110 is stored in database 220.

Figure 5:
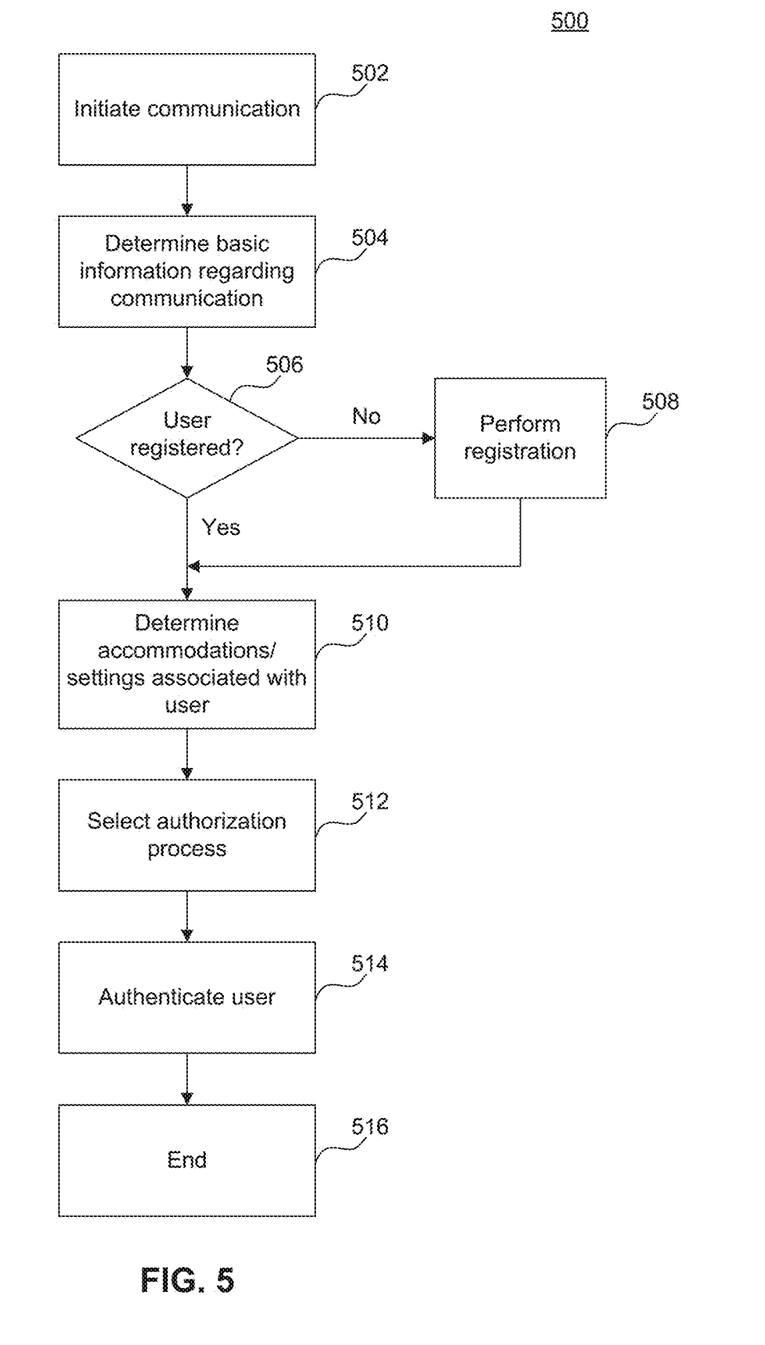
FIG. 5 illustrates a flowchart diagram of a method of authenticating a user via the communication system of FIG. 1, according to embodiments of the present disclosure.

FIG. 5 illustrates a flowchart diagram of a method of authenticating a user via the communication system of FIG. 1, according to embodiments of the present disclosure. In FIG. 5, a method of authenticating a party begins when a communication is initiated (502). The communication initiates when a party attempts to communicate with another party via communication system 100. For example, when an inmate dials a phone number or presses a send button for a text or email using inmate communication device 120 to contact an outsider using outsider communication device 130. Next, communication center 110 determines basic information regarding the communication (504). The basic information includes, for example, the purported parties of the communication or purported locations of the purported parties. Based on the basic information, communication center 110 identifies which of the purported users is registered to use communication system 100 and which are not registered. (506). For a user not registered, a registration or enrollment process is performed (508). An exemplary registration process may include steps described above for FIG. 4.

Once two or more purported parties are registered, profile subsystem 214, determines any accommodations and settings required for each of the parties (510). Examples of accommodations or settings that may be required for a party include a handicap, such as blindness or hearing impaired, which preclude the party from performing certain authentication processes, or a preferred language of the party.

Based on the required accommodations and settings, authentication subsystem 216 selects an authentication process for each of the parties (512) and then performs the authentication process (514). Examples of authentication processes that may be performed include one or more of challenge questions and biometric verifications. For example, a party may be required to answer a challenge question including responding to questions regarding one or more of a previous addresses of the party, the name of the party, a birthdate of the party, a PIN, a name of someone associated with the party, or an identification number of the party. Further, a challenge question may request only a portion of the actual answer, such as only the last four digits of the party's social security number be a response. Combination of authentication processes may also occur and may include a rolling challenge question that requires the party to audibly or visually respond to the challenge question. Examples of combinations of authentication process may include a response to a challenge question that requires a party to audibly state his/her mother's maiden name or for the party to respond to the answer either verbally or by touch paid while in front of a camera of inmate communication device 120 or outsider device 130 such that an audio sample, a video sample, or an image sample of the party is captured.

In an embodiment, challenge questions are rolling and randomly change for each authentication process such that a current challenge question differs from a previous challenge question.

Moreover, based on the accommodations, a party may be allowed to perform an authentication process according to the accommodation. For example, in the case of a party that is blind, a response to a challenge question may be given verbally. As another example, in the case of a party that is hearing impaired, a response to a challenge question may be given via a teletypewriter (TTY), connected to a communication device, or by sign language via a video relay translation. As another example, in the case of a different language, all questions and responses may be in the preferred language.

Once the authentication subsystem 216 receives required information from inmate communication device 120 or outsider communication device 130, the received information is compared to stored identity data to determine whether the purported party is in fact an authorized party. For example, the authentication subsystem 216 receives information including an audible response to a challenge question asking a date of arrest of the party, at which time the authentication subsystem 216 compares the audio sample with saved voice data associated with the party and saved profile data associated with the party.

After an authentication process has been performed, data from the authentication process, i.e. whether or not a party is authorized to communicate via the communication system, can be used by the communication subsystem 212 to connect the communication and the method of authenticating a party ends (516).

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
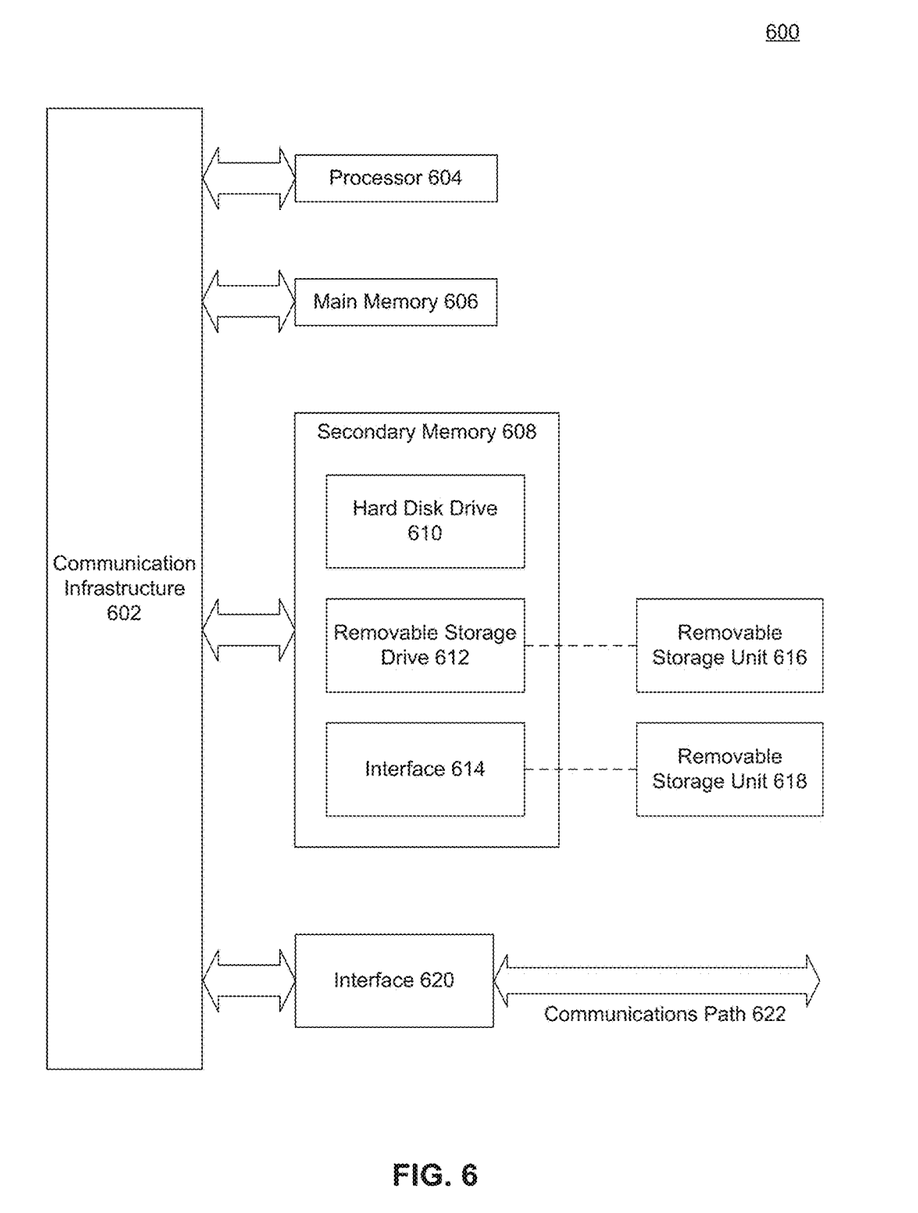
FIG. 6 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for communication by an inmate of a correctional system, the system comprising:
   a communication subsystem configured to connect a communication between a first communication device used by the inmate of the correctional system and a second communication device;
   a profile subsystem configured to determine profile information of a party associated with the first communication device; and
   an authentication subsystem configured to:
      determine an accommodation of the party that affects authentication in the profile information of the party;
      provide one or more challenge questions to the first communication device based on determining the accommodation of the party that affects authentication;
      receive at least one response to the one or more challenge questions from the first communication device; and
      authorize connection of the communication between the first communication device and the second communication device based on the at least one response.

2. The system of claim 1, wherein the profile subsystem is further configured to receive contact information of the party from the first communication device and determine the profile information of the party based on the contact information.

3. The system of claim 2, wherein the profile subsystem is further configured to perform a registration process for the party before determining the profile information of the party based on the contact information.

4. The system of claim 1, wherein the profile subsystem is further configured to obtain the profile information from one or more of a Jail Management Database, an Offender Management Database, a public database, or a questionnaire.

5. The system of claim 1, wherein the authentication subsystem is further configured to formulate the one or more challenge questions to verify that an identity of a user of the first communication device is the party associated with the first communication device, wherein the accommodation of the party that affects authentication comprises at least one of blindness or a hearing impairment of the party.

6. The system of claim 5, wherein the authentication subsystem formulates the one or more challenge questions based on information obtained from one or more of a Jail Management Database, an Offender Management Database, a public database, or a questionnaire.

7. The system of claim 1, wherein the authentication subsystem is further configured to receive biometric information along with the at least one response to the one or more challenge questions from the first communication device, and authorize the connection of the communication based on the at least one response and the biometric information.

8. The system of claim 7, wherein the accommodation of the party that affects authentication comprises blindness, wherein the biometric information comprises a voice sample obtained by the first communication device, and wherein the at least one response to the one or more challenge questions is included within the voice sample.

9. The system of claim 1, wherein the authentication subsystem is further configured to:
   determine one or more previous challenge questions; and
   exclude the one or more previous challenge questions from the one or more challenge questions.

10. A system for communication by an inmate of a correctional system, the system comprising:
    a communication subsystem configured to connect a communication between a first communication device and a second communication device, wherein one of the first communication device or the second communication device is used by the inmate of the correctional system;
    a profile subsystem configured to determine profile information of a party associated with the first communication device, wherein the profile information includes an accommodation of the party that affects an authentication process; and
    an authentication subsystem configured to perform the authentication process, the authentication process comprising:
       providing one or more challenge questions to the first communication device based on the profile information including the accommodation of the party;
       receiving at least one response to the one or more challenge questions from the first communication device; and
       authorizing connection of the communication between the first communication device and the second communication device based on the at least one response.

11. The system of claim 10, wherein the accommodation of the party is a preferred language of the party, and the authentication subsystem is further configured to provide the one or more challenge questions such that the one or more challenge questions is in the preferred language.

12. The system of claim 10, wherein the accommodation of the party relates to a handicap of the party, and the authentication subsystem is further configured to provide the one or more challenge questions such that the one or more challenge questions accommodate the handicap related to the party.

13. The system of claim 10, wherein the profile subsystem is further configured to obtain the profile information from one or more of a Jail Management Database, an Offender Management Database, a public database, or a questionnaire.

14. The system of claim 10, wherein the authentication subsystem is further configured to receive biometric information along with the at least one response to the one or more challenge questions from the first communication device, and authorize the connection of the communication based on the at least one response and the biometric information.

15. The system of claim 14, wherein the accommodation of the party that affects authentication comprises blindness, wherein the biometric information is a voice sample obtained by the first communication device, and wherein the at least one response to the one or more challenge questions is included within the voice sample.

16. The system of claim 14, wherein the accommodation of the party that affects authentication comprises a hearing impairment, wherein the biometric information is a video sample obtained by the first communication device, and wherein the at least one response to the one or more challenge questions is included within the video sample.

17. The system of claim 10, wherein the authentication subsystem is further configured to: receive biometric information and a key pad entry in response to the one or more challenge questions; and authorize the connection of the communication based on the biometric information and the key pad entry.

18. The system of claim 10, wherein the authentication subsystem is further configured to:
    determine one or more previous challenge questions; and
    exclude the one or more previous challenge questions from the one or more challenge questions.

19. A system for communication by an inmate of a correctional system, the system comprising:
    a communication subsystem configured to connect a communication between a first communication device and a second communication device, wherein one of the first communication device or the second communication device is used by the inmate of the correctional system;
    a profile subsystem configured to determine profile information of a party associated with the first communication device and determine an authentication process for the party based on the profile information, wherein the profile information includes an accommodation of the party that affects the authentication process; and
    an authentication subsystem configured to perform the authentication process, the authentication process comprising:
        providing one or more challenge questions to the first communication device based on the profile information including the accommodation of the party;
        receiving at least one response to the one or more challenge questions from the first communication device; and
        authorizing connection of the communication between the first communication device and the second communication device based on the at least one response.

20. The system of claim 19, wherein the profile subsystem further determines the authentication process based on authentication requirements of the correctional system.

\* \* \* \* \*